W. H. SWENARTON.
DESICCATED MILK AND PROCESS OF MAKING THE SAME.
APPLICATION FILED JUNE 12, 1911.
1,056,719.
Patented Mar. 18, 1913.
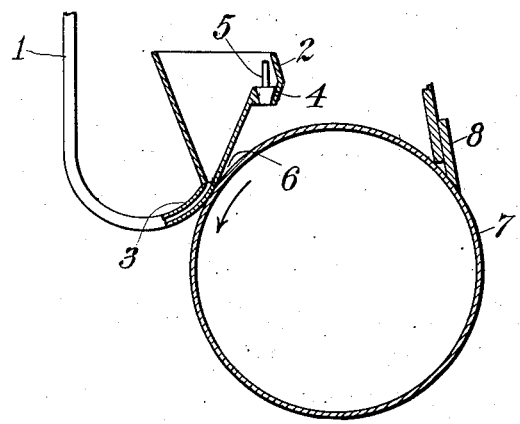
Attest:
M. E. Eveland
L. E. Johnston
Waitstill H. Swenarton.
Inventor:

UNITED STATES PATENT OFFICE.

WAITSTILL H. SWENARTON, OF MONTCLAIR, NEW JERSEY.

DESICCATED MILK AND PROCESS OF MAKING THE SAME.

1,056,719.  Specification of Letters Patent.  Patented Mar. 18, 1913.

Original application filed January 13, 1906, Serial No. 295,886. Divided and this application filed June 12, 1911. Serial No. 632,640.

*To all whom it may concern:*

Be it known that I, WAITSTILL H. SWENARTON, a citizen of the United States, residing in Montclair, county of Essex, and State of New Jersey, have invented new and useful Improvements in Desiccated Milk and the Process of Making the Same, of which the following is a specification.

My invention relates to the desiccation of milk and has for its object the production of the milk-solids in the form of a fluffy, flaky powder, which upon the addition of warm water thereto will readily dissolve and emulsify to form a liquid having all the properties of normal milk. These objects I attain by delivering a film of homogeneously concentrated milk, free from unconcentrated portions, to moving heated surfaces initially heated in excess of five (5) degrees centigrade above the boiling point of the milk at the pressures at which the operation is performed. The film is cooled during the formation of the same by the inflowing milk in its passage to the receiving receptacle but without direct contact therewith and is removed from the heating surface prior to the complete evaporation of the water therefrom and while still possessing a slightly moist appearance.

Milk has long been considered a typical emulsion, and naturally the casein, which is the principal proteid constituent, exists in the form of what has been termed a dicalcium caseinate, which, owing to its affinity for water, is in a highly swollen state. If the so-called poise of the calcium caseinate molecule is affected, either by protracted heating at those temperatures at which the calcium salts precipitate, or by excessive drying, the calcium caseinate loses to a greater or less extent this affinity for water and therefore the formation of a perfect emulsion upon the addition of warm water to the dry product, no longer results.

Besides casein, milk and especially skim-milk, contains in almost equal amounts, lactose or milk-sugar. This milk-sugar normally crystallizes with one molecule of water ($C_{12}H_{22}O_{11}, H_2O$). Although this water is not yielded up after crystallization has taken place until the temperature reaches about 140 C., nevertheless prior to such crystallization the water present in which the milk-sugar is dissolved, may be entirely evaporated at temperatures much below 140 C., and these temperatures approximate the boiling point of water at the pressure at which the process is performed. Then again milk-sugar caramelizes when heated in the air to high temperatures and in a concentrated condition. At high temperatures also the air has an energetic action upon the same and renders it very difficultly soluble. The well known skin which forms when milk is heated in the air for protracted periods even at the boiling point illustrates the above noted changes in the casein and milk sugar due to protracted heating in the air. The proper treatment of the two ingredients above noted, therefore, is the crux of all drying processes.

Heretofore in desiccating milk *in vacuo*, to which method of drying my process particularly relates, temperatures used have been such that the heating surface or roll was maintained at and even in rare instances above the boiling point of the liquid in the vacuum maintained, but in each instance, either the temperature of the medium used to heat the surface or roll, which temperature is approximately indicated by the initial temperature of the roll, was less than five (5) degrees centigrade above the boiling point of the particular vacuum maintained, or again in cases where the temperature was sufficiently high, the method of delivering the milk to the heating surface was such that an unequal and non-homogeneous layer was deposited upon said rolls. In the former process, owing to the considerable cooling effect of the large body of inflowing unconcentrated liquid in the retaining pocket or receptacle, the temperature of the heating surface falls to such an extent that the immediate vaporization of the water in the film (as distinguished from immediate boiling), fails to occur and hence in lieu of a ten second period of heating of the film as is the case in my process as hereinafter described, in many cases forty-five seconds is required, with the results due to prolonged heating heretofore noted. In the latter process since a thin layer of unconcentrated liquid naturally required less time to dry than a thick layer of concentrated liquid, the process was impracticable because exact regulation of the drying period in order to obtain a uniform product was obviously impossible. In neither of the above cases moreover was any allowance made for the five per cent. of water which the molecule of milk sugar is capable of chemically uniting with, but the milk was reduced to complete or "bone" dryness as is borne out by the reference in those cases to subsequent grinding in a pebble mill or otherwise in order to produce an impalpable powder which could thus offer the largest possible surface to any liquid added thereto. These products, however, notwithstanding their impalpable condition, were granular and failed to emulsify in a satisfactory manner upon the addition of warm water thereto, and in no instance was the temperature of the heating surface sufficiently high to produce a sterile milk powder, $i. e.$ above 75° C., as although many disease producing bacteria are destroyed when temperatures of from 65° C. to 70° C. are maintained for periods extending over several minutes, a momentary heating period requires a higher temperature for the destruction of the bacteria and in both cases a temperature in excess of 75° C. is required to destroy the spores which in certain instances even multiply at 70° C. Owing to the violent agitation and thorough heating of every particle of the milk, even momentary heating above 70° C. serves in my process to destroy substantially all deleterious bacteria.

Having thus indicated the nature and object of my process, and in order to enable those skilled in the art to practise the same, I will now proceed to describe my preferred mode of performing it, reference being had to the apparatus disclosed in the accompanying drawings, forming a part of this specification.

In both the specification and claims I include under the term milk various lacteal liquids having similar properties, such as normal milk, skim-milk, modified milk, solutions of casein, etc.

The process may be carried out in any suitable apparatus, such for example as described in my copending application, No. 295886 filed January 13, 1906, of which this is a division, (matured into Patent 995,303, dated June 13, 1911), one modification of which is shown, for the purpose of illustration, in the accompanying drawings in which the figure shown is in elevation, chiefly in section, of a single evaporating cylinder as employed either in a vacuum chamber or in the open air.

Referring to the drawings, the numeral 1 represents the supply pipe which is in communication with a reservoir (not shown) and may be arranged to permit of gravity feed of the milk in lieu of the customary forced feed, if desired. A distributer 2 is extended at the bottom 3 in the form of an arc which may, if desired, possess a radius equal to that of the abutting cylinder and is preferably of nickel steel. The supply pipe 1 is connected with the arc-like extension distant from the cylinder and adjustable conical valves 4, on stems 5 (partially shown), serve to regulate the supply of milk to the retaining pocket 6 formed between the distributer and the abutting cylinder 7. A doctor 8 serves to remove the tenacious film from the cylinder when the same is revolving in the direction indicated by the arrow.

The operation of my process, as preferably carried out is as follows: The milk is delivered to the retaining pocket formed by the abutting distributer and cylinder and the temperature of the cylinder is preferably $\frac{82.5}{100}$ of the boiling point if a temperature sufficient to destroy the developed bacteria and not the spores is used, as for example 75° C., then a vacuum of 54.5 cm. is preferably maintained. If it be desired to produce a so-called milk-powder capable of reproducing a solution in which lactic acid fermentation progresses on standing, in a manner similar to that in the case of normal milk, and which solution will be readily peptonized by rennet, I preferably heat the cylinder to 54.5° C. while maintaining a vacuum corresponding to 45° C. or as given in physico-chemical tables 68.6 cm.

In order to eliminate the well known skin fromed by the action of air at high temperatures upon the casein, milk-sugar and various salts normally found in milk, and which skin caused the occlusion of the steam with a consequential protracted heating of the milk solids, whether evaporating under low vacuum or in the open air, I have discovered an economical and effective method whereby the film while forming, is maintained below the temperature at which the said deleterious action occurs, or as it may be termed, the critical temperature, and the heat so abstracted is conserved and utilized to heat the inflowing milk in its passage to the retaining pockets. This cooling effect I accomplish by causing the milk in its passage from the reservoir to the distributer, to expand into a thin layer or sheet, and to contact with the opposite surface of the nipping or film-forming wall from that in contact with the concentrated milk in the retaining pocket and adjacent the area where the formation of said film occurs. The bottom of the distributer, as shown, is extended in the form of an arc, which preferably is from 1.5 to 2.5 cm. across at a point adjacent the cylinder whereby a continuous sheet of milk of the above depth may be caused to cool the forming film. The bottom of said distributer may be either extended along the entire length, or it may be extended at intervals along the same, without departing from the spirit of my invention which includes any method of transference of the heat from the film while forming to inflowing milk in its passage to the retaining pocket. Since the inner surface of the distributer merges into that of the extension in a continuous curve it is perfectly smooth with the result that circulation of milk along the same is entirely unimpeded. In practice my distributer is provided with extremely thin walls in order to effect the greatest amount of cooling of the film and suitable adjusting means are provided, whereby the distance of the distributer from the cylinder may be accurately regulated.

Whichever one of the above methods of delivering the milk is selected is immaterial in so far as the next stage of the process is concerned, as the water in the milk, upon contact with the highly heated cylinders (highly heated with respect to the vacuum) is immediately vaporized and unless the film is almost instantly removed therefrom while still slightly moist and tenacious, the water of crystallization, which serves as a margin of safety so to speak, is evaporated with the resultant destruction of the desired properties heretofore noted. In practice the film is removed while still possessing a slightly moist appearance and while retaining sufficient water to possess when cool a moisture content in excess of 1% and in the case of milk consisting of ⅔ whole milk and ⅓ skim-milk the powder should contain from 2% to 4% of moisture. On cooling a film containing the amount of moisture stated, the chemical and physical absorption of water occurs with the production of a perfectly dry powder, which owing to the entire absence of caking while evaporating, readily disintegrates and may be sifted to a light, fluffy, flaky powder approximating $\frac{5}{10}$ S. G. without resorting to grinding as is customary in other vacuum processes.

A speed of six revolutions per minute as against one revolution in 45 seconds customary in another well known vacuum process, can be maintained in my process and in practice the size of the rolls is such that this speed is equivalent to a peripheral speed of 14 meters per minute.

The term "palpable" as used in the claims is employed to distinguish from the impalpable product which is inevitably deposited in the well-known atomization processes for drying milk-like products, and any products produced by such processes, or by other processes carried out at normal or supernormal atmospheric pressures are hereby specifically disclaimed.

Having thus described my invention, what I claim and desire to secure by Letters Patent is:—

1. The process of desiccating the solid-content of milk which consists in rapidly concentrating a body of milk *in vacuo*, withdrawing a thin layer of milk therefrom, delivering said thin layer of milk onto an evaporating surface *in vacuo*, heated in sufficient excess of the boiling point of the vacuum to effect rapid evaporation of the liquid content of said milk below seventy-five (75) degrees centigrade, and then removing the film from such surface in such a condition that its moisture content when cool is in excess of one and one-half per cent.

2. The process of desiccating the solid-content of milk which consists in rapidly concentrating a body of milk *in vacuo*, withdrawing a thin layer of milk therefrom, delivering said thin layer of milk onto an evaporating surface *in vacuo*, heated in sufficient excess of the boiling point of the vacuum to effect rapid evaporation of the liquid content of said milk below seventy-five (75) degrees centigrade, and then removing the film from such surface in such a condition that its moisture content when cool is in excess of between one and one-half and five and one-half per cent.

3. The process of desiccating the solid-content of milk which consists in rapidly concentrating a body of milk *in vacuo*, withdrawing a thin layer of milk therefrom, while effecting a transfer of heat units from the outer surface of said film to the inflowing milk in close proximity thereto and out of contact therewith.

4. In the process of desiccating the solid-content of milk *in vacuo* by contact with a moving surface heated in excess of five degrees centigrade above the boiling point of the vacuum, the steps which consist in conveying a mass of milk from the source of supply while under pressure of at least atmospheric, through a covered conduit into a receptacle of relatively large superficial content; then maintaining a vacuum immediately above the relatively large exposed surface of the milk in said receptacle, while maintaining same out of direct contact with a moving evaporating surface heated in excess of five degrees centigrade above the boiling point of the vacuum whereby expansion of said milk prior to contact with said surface is permitted, and then delivering said milk onto said moving surface while the latter is heated in excess of five degrees centigrade above the boiling point of the milk in said vacuum, and below seventy-five degrees centigrade, and then removing said milk in the form of a self-sustaining mass having the identity of a film from said surface in such a condition that its moisture-content when dry and cool is in excess of one and one-half per cent.

5. The process of desiccating the solid-content of milk which consists in rapidly concentrating a body of milk *in vacuo*, withdrawing a thin layer of milk therefrom, delivering said thin layer of milk onto an evaporating surface *in vacuo*, heated in sufficient excess of the boiling point of the vacuum to effect rapid evaporation of the liquid content of said milk below sixty degrees centigrade, and then removing the film from such surface in such a condition that its moisture content when cool is in excess of one and one-half per cent.

6. The process of desiccating the solid-content of milk which consists in rapidly concentrating a body of milk *in vacuo*, withdrawing a thin layer of milk therefrom, delivering said thin layer of milk onto an evaporating surface *in vacuo*, heated in sufficient excess of the boiling point of the vacuum to effect rapid evaporation of the liquid content of said milk below fifty-five degrees centigrade, and then removing the film from such surface in such a condition that its moisture content when cool is in excess of one and one-half per cent.

7. The product resulting from the desiccation of the solid-content of milk, being characterized by the moisture content in excess of one per cent. (1%), containing palpable particles, being emulsifiable with water to form a liquid having a natural milk-like odor and appearance, and substantially free from any "burned" or "boiled" flavor due to the presence of caramelized or altered milk-sugar, altered casein, or altered lact-albumin.

8. The product resulting from the desiccation *in vacuo* of the solid content of milk, being characterized by a moisture content between one and one half and five per cent. and containing palpable particles capable of forming an aqueous emulsion having natural milk-like odor, appearance and souring and peptonizing properties, said product having a specific gravity considerably less than $\frac{8}{10}$ and consisting only of the natural original ingredients of milk in an unaltered and readily emulsifiable condition.

9. The product resulting from the desiccation *in vacuo* of the solid content of milk, being characterized by a moisture content between two and four per cent. and containing palpable particles capable of forming an aqueous emulsion having natural milk-like odor, appearance and souring and peptonizing properties, said product having a specific gravity considerably less than $\frac{8}{10}$ and consisting only of the natural original ingredients of milk in an unaltered and readily emulsified condition.

10. The product resulting from the desiccation *in vacuo* of the solid content of milk, being characterized by a moisture content between two and four per cent. and containing palpable particles capable of forming an aqueous emulsion having natural milk-like odor, appearance and souring and peptonizing properties, said product having a specific gravity considerably less than $\frac{8}{10}$ and consisting only of the natural original ingredients of milk in an unaltered and readily emulsifiable condition.

11. The product resulting from the desiccation *in vacuo* of the solid content of milk, being characterized by a moisture content between two and four per cent. and containing palpable particles capable of forming an aqueous emulsion having natural milk-like odor, appearance and souring and peptonizing properties, said product having a specific gravity approximately $\frac{5}{10}$ and consisting only of the natural original ingredients of milk in an unaltered and readily emulsifiable condition.

In witness whereof, I have hereunto set my hand at the city of New York, this ninth day of June, 1911.

WAITSTILL H. SWENARTON.

Witnesses:
 L. E. JOHNSTON,
 M. E. EVELAND.